(12) United States Patent
Dale (10) Patent No.: US 8,261,647 B2
(45) Date of Patent: Sep. 11, 2012

(54) SELF LOCKING ADJUSTABLE BLADE GUIDE FOR BAND SAW

(75) Inventor: Peter Dale, Kilworthy (CA)

(73) Assignee: Norwood Industries, Inc., Ontario (CA)

( * ) Notice: Subject to any disclaimer, the term of this patent is extended or adjusted under 35 U.S.C. 154(b) by 0 days.

(21) Appl. No.: 12/917,306

(22) Filed: Nov. 1, 2010

(65) Prior Publication Data

US 2011/0185875 A1 Aug. 4, 2011

(51) Int. Cl.
*B27B 3/10* (2006.01)
*B27B 13/10* (2006.01)
*B26D 1/46* (2006.01)

(52) U.S. Cl. ............................................ 83/764; 83/820

(58) Field of Classification Search ............... 83/168, 83/409, 703, 707, 761, 764, 805, 814, 820
See application file for complete search history.

(56) References Cited

U.S. PATENT DOCUMENTS

| | | | | |
|---|---|---|---|---|
| 2,081,033 A * | 5/1937 | Biro | ................ | 83/817 |
| 2,627,881 A * | 2/1953 | Houtte et al. | .................. | 83/816 |
| 2,695,637 A * | 11/1954 | Ocenasek | ....................... | 83/814 |
| 3,034,387 A * | 5/1962 | Sebastian | ........................ | 83/168 |
| 3,280,862 A * | 10/1966 | Foley | .............................. | 83/814 |
| 3,643,536 A * | 2/1972 | Alexander | ...................... | 83/820 |
| 3,695,316 A | 10/1972 | Pluckhahn | | |
| 3,965,788 A | 6/1976 | Granberg | | |
| 3,979,988 A * | 9/1976 | Best | ............................... | 83/820 |
| 4,210,049 A | 7/1980 | Gauthier | | |
| 4,232,579 A * | 11/1980 | Craddock et al. | ............... | 83/788 |
| 4,235,140 A | 11/1980 | Reece | | |
| 4,245,535 A | 1/1981 | Lockwood et al. | | |
| 4,275,632 A | 6/1981 | Ross | | |
| 4,300,428 A | 11/1981 | Woodland | | |
| 4,307,641 A | 12/1981 | Shapleigh | | |
| 4,327,621 A * | 5/1982 | Voorhees et al. | ............... | 83/820 |
| 4,336,731 A * | 6/1982 | Eklund | ............................ | 83/74 |
| 4,342,241 A * | 8/1982 | Eklund | ............................. | 83/56 |
| 4,574,675 A * | 3/1986 | Hallstrom | ....................... | 83/804 |
| 4,640,170 A | 2/1987 | Bakken | | |
| 4,641,560 A * | 2/1987 | Kolberg | .......................... | 83/788 |
| 4,920,846 A * | 5/1990 | Duginske et al. | ............... | 83/820 |
| 5,243,892 A | 9/1993 | Jindra | | |
| 5,301,586 A * | 4/1994 | Ohnishi et al. | .................. | 83/820 |
| 5,410,934 A * | 5/1995 | Krippelz | ......................... | 83/820 |
| 5,784,941 A | 7/1998 | Sanbron | | |
| 6,679,148 B2 * | 1/2004 | Chiang | ............................ | 83/788 |
| 6,857,347 B1 * | 2/2005 | Benedict et al. | ............... | 83/546 |
| 7,077,041 B2 * | 7/2006 | Kunkel et al. | ..................... | 83/34 |
| 7,287,454 B2 * | 10/2007 | McIntosh | ......................... | 83/788 |
| 7,520,202 B2 * | 4/2009 | Wang | .............................. | 83/820 |

(Continued)

OTHER PUBLICATIONS

"Sawmill, portable sawmills, mobile sawmills, band sawmills, portable band sawmills, bandmills, Norwood", printed from http://www.norwoodindustries.com/en/Home_Norwood_Sawmills.aspx on Oct. 29, 2010, 4 pages.

"Blades & Blade Material", printed from http://www.norwoodindustries.com/en/content/Products.aspx on Oct. 29, 2010, 4 pages.

*Primary Examiner* — Sean Michalski (57) ABSTRACT

An adjustable blade guide for a band saw such as a band saw on a sawmill utilized for sawing lumber. The blade guide is easily adjusted to account for variations in the diameter of the lumber to be cut, and is self locking.

14 Claims, 9 Drawing Sheets

U.S. PATENT DOCUMENTS

| | | | |
|---|---|---|---|
| 7,739,937 B2 * | 6/2010 | Pollard, Sr. | 83/820 |
| 2002/0023527 A1 * | 2/2002 | Wood | 83/821 |
| 2004/0103773 A1 * | 6/2004 | Helshoj | 83/820 |
| 2006/0090625 A1 * | 5/2006 | Wang | 83/788 |
| 2006/0117926 A1 | 6/2006 | Dale et al. | |
| 2007/0044609 A1 * | 3/2007 | Brazell et al. | 83/100 |
| 2007/0234869 A1 | 10/2007 | Dale et al. | |
| 2011/0041663 A1 * | 2/2011 | Chaffin et al. | 83/168 |

* cited by examiner

SELF LOCKING ADJUSTABLE BLADE GUIDE FOR BAND SAW

CROSS REFERENCE TO RELATED APPLICATION

This application claims priority under 35 U.S.C. §119 to Canadian Patent Application Number 2,688,407, filed Dec. 9, 2009, the disclosure of which is incorporated herein by reference in its entirety.

FIELD OF THE INVENTION

The present invention relates to an adjustable blade guide for a band saw such as a band saw on a sawmill utilized for sawing lumber. The blade guide is easily adjusted to account for variations in the diameter of the lumber to be cut, and is self locking.

BACKGROUND OF THE INVENTION

A conventional band saw is often used in sawmills. Such a band saw typically has a relatively large, circular, band saw blade, mounted along the path of travel of a log placed on a suitable moving bed with a drive mechanism for advancing the log against the blade. Alternatively, the log remains stationary and the band saw is mounted on a carriage which is capable of transverse displacement along the log.

One problem faced with band saws having large band saw blades is the tensioning of said blade. The blade moves in a generally circular path, typically around two band wheels, one of which is powered by a motor, either via direct drive or a belt drive. The portion of the saw blade between the two band wheels is often exposed and largely unrestrained; complex forces on the blade as it passes through the log result in substantial and undesired transverse motion of the blade, resulting in reduction in efficiency, reduction in accuracy of the cut, and an increase in wear on the saw blade and sometimes its drive assembly and motor.

In order to counteract such forces, various mechanisms are used. For example, a blade tensioning system may be used to provide increased tension on the blade.

This will help restrict transverse motion, but often at the cost of added parts, and an increase in tension (and a resulting increase in wear) on the band wheels. Another example of a mechanism used to decrease transverse motion on the blade is the use of one or more blade guides which act to guide the blade. Typically, a blade guide will be rigidly affixed to the band saw, and extend into, or immediately proximal to, the path of the blade. A blade guide will often have an upper and a lower jaw and rear thrust plate, each having roller wheels or other low friction running surface, or alternatively, one-sided support surface and rear thrust plate. The flat portion of the blade, or in the alternative, the straight edge of the blade, will travel along the roller wheels. Since the blade guide is affixed to the band saw, it helps prevent transverse motion while minimally affecting the desired rotatory blade motion.

There are several prior inventions for band saws.

U.S. Pat. No. 4,275,632 describes a portable sawmill comprising a U-shaped support or carriage, holding a band saw. When in use, a log is placed between the two guide rails and is supported in place by a jacking mechanism with adjustable shelves. The band saw is in a generally horizontal position (though with one end slightly elevated), and does not adjust in a vertical direction; instead, the log itself is moved up and down using a jacking mechanism. The patent describes a blade tensioning system as well as guide rollers. The guide rollers engage the straight edge of the band saw as an aid in holding the band saw in position on the wheel.

Canadian Patent No. 1,200,180 describes a portable sawmill having a band saw on a carriage. The carriage is moveable along the guide rail along two sets of wheels, one engaged with the upper side of the guide rail and the other with the lower side. The band saw comprises a circular band saw blade which travels along two band saw wheels. The band saw has a stationary blade guide, having a set of blade guide wheels, guides the blade on the lower drive side. The band saw also has a movable blade guide, having a set of blade guide wheels, on the driven side. The movable blade guide allows for adjustment of the length of the exposed cutting section of the blade. The adjustable blade guide is attached to a telescopic guarded tube arrangement which protects a portion of the blade. The adjustable blade guide is adjusted through a screw and nut "T" handle, which allows tightening of the assembly. To adjust the adjustable blade guide, one unscrews the screw on the T handle, then moves the blade guide to the desired position. Then one tightens the screw on the T handle, affixing the blade guide in position.

The LumberMate™ band sawmill (http://www.norwood-industries.com) is a portable sawmill having a band saw with a circular band saw blade which rotates around two band saw wheels. The band saw has a stationary blade guide, having a set of blade guide wheels, guides the blade on the lower drive side. The band saw also has a movable blade guide, having a set of blade guide wheels, on the driven side. The movable blade guide allows for adjustment of the length of the exposed cutting section of the blade. Similarly to the blade guide described in CA 1,200,180, the adjustable blade guide is adjusted through a screw and nut "T" handle, which allows tightening of the assembly. To adjust the adjustable blade guide, one unscrews the screw on the T handle, then moves the blade guide to the desired position. Then one tightens the screw on the T handle, affixing the blade guide in position.

There is a need for an improved portable sawmill having an adjustable blade guide that is easy to adjust and self locking.

SUMMARY OF THE INVENTION

The present invention provides a saw head for a sawmill, said saw head comprising: a frame, a drive driving a saw blade, and a blade guide contacting said saw blade and capable of decreasing transverse and/or vertical movement of the band saw blade when said blade is in motion. The blade guide is affixed to a guide support which is slidably engaged to the frame. The guide support has a guide support adjuster pivotally connected thereto at a proximal end, having a distal end, and having teeth on its lower edge, said teeth capable of engaging a peg affixed to the frame. When the distal end is lifted, the guide support is capable of horizontal motion thereby adjusting the position of the blade guide on the saw blade, and, when the distal end is dropped, at least one of said teeth engage the peg, locking the guide support in place and preventing said horizontal motion.

The invention also teaches a second blade guide affixed to the frame, contacting said saw blade, and capable of decreasing transverse movement of the saw blade when said blade is in motion, whereby the line between the blade guide and the second blade guide define a cutting section.

In an embodiment the sawmill comprises a sawmill base, a sawmill carriage sitting on top of said sawmill base, said sawmill carriage having at least one saw head support capable of supporting the saw head. The sawmill base extends in a generally horizontal direction and comprises at least one rail, and the carriage is capable of longitudinal displacement across said rail.

In an embodiment, the saw head, when affixed to the saw head support, is capable of vertical displacement thereto.

The saw blade can be a band saw blade or a reciprocating saw blade.

The invention also provides a sawmill, comprising a sawmill base, extending in a generally horizontal direction, and having at least one rail and a sawmill carriage, capable of longitudinal displacement across said rail. The sawmill carriage has at least one vertical support, extending in a generally vertical direction from said base, and supporting a saw head of the invention capable of vertical displacement along the vertical support.

DETAILED DESCRIPTION OF THE PREFERRED EMBODIMENTS

The present invention provides a simple and effective, adjustable blade guide mechanism for a band saw. The adjustable blade guide is self locking in that it can be adjusted to a desired position without the need for screwing or unscrewing restraining bolts. The blade guide's design enables it to be quickly adjusted with one hand by an operator. The self locking feature reduces the number of steps required by the operator in adjusting the blade guide, thus increasing efficiency and safety of operation.

An embodiment of the present invention will now be described as shown in FIGS. 1-5 and 9.

Figure 9:
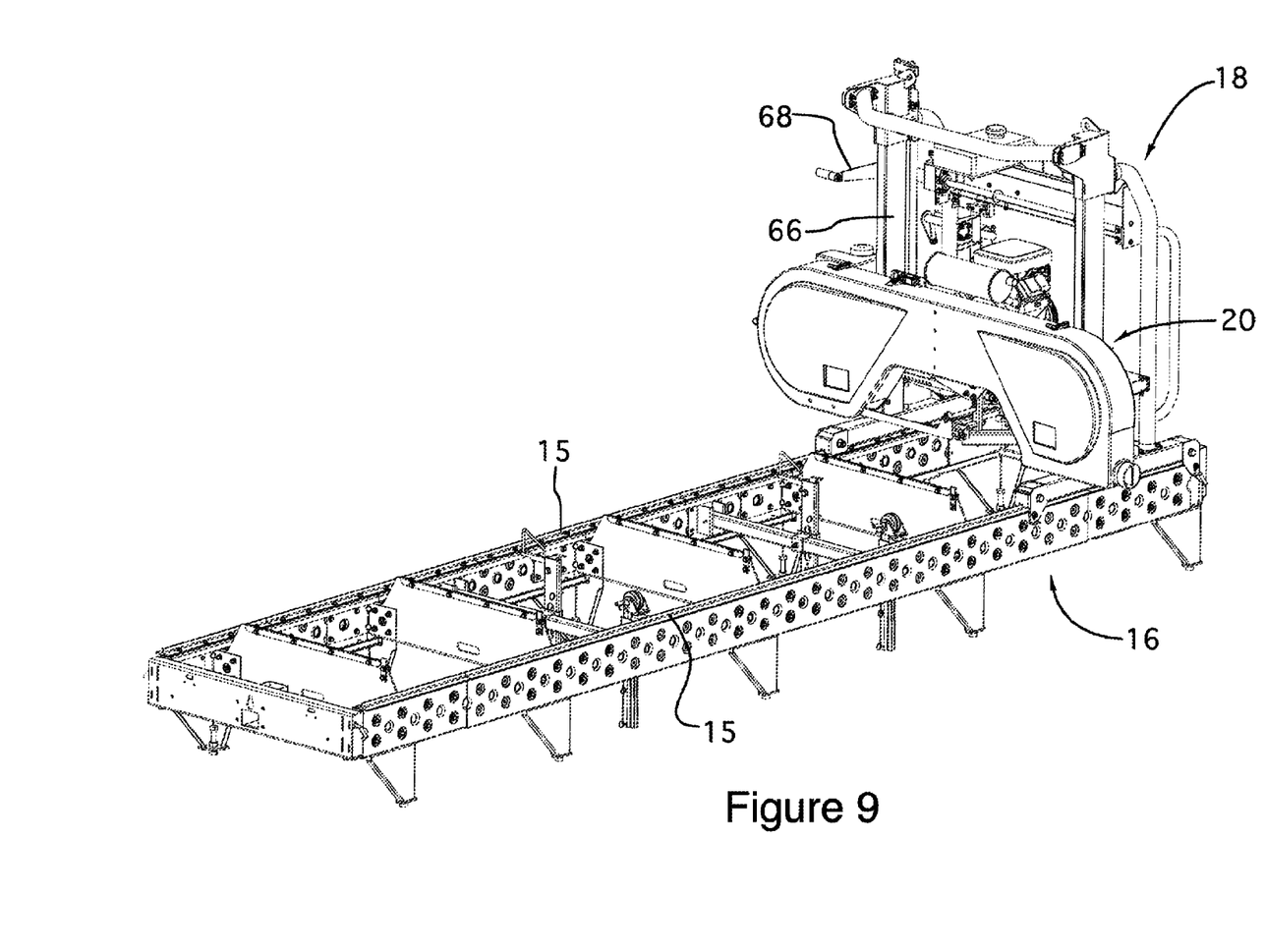
FIG. 9 is a front side perspective view of the band saw head of FIG. 1 as seen installed on a sawmill.

Band saw head 20 is designed to be used as part of a sawmill (as shown in FIG. 9 only). Briefly, band saw head 20 is fitted to carriage 18 which is capable of longitudinal displacement on rails 15 of sawmill base 16. Band saw head 20 is capable of vertical displacement in relation to sawmill base 16 through displacement along depth of cut ruler 52. Tension on the blade is controlled by saw head tension T handle 50. The saw head can be moved vertically along vertical posts 66 by operation of crank 68 (FIG. 9).

Figure 1:
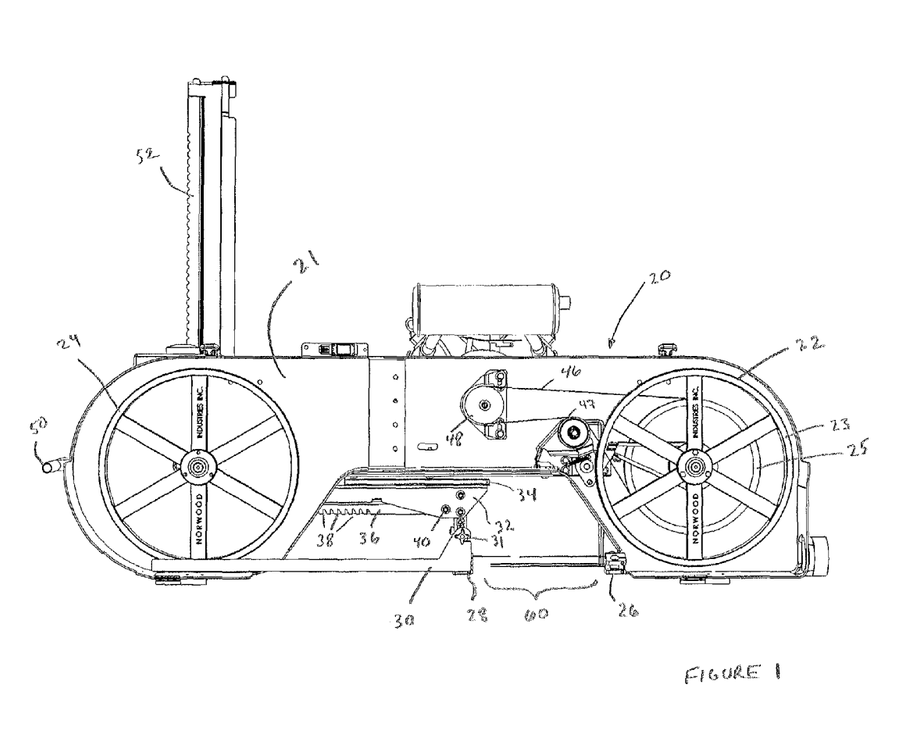
FIG. 1 is a front elevation view of a band saw head according to one aspect of the present invention, with the protective cover off so that the internal components can be viewed, and is labeled with its major components.
Figure 2:
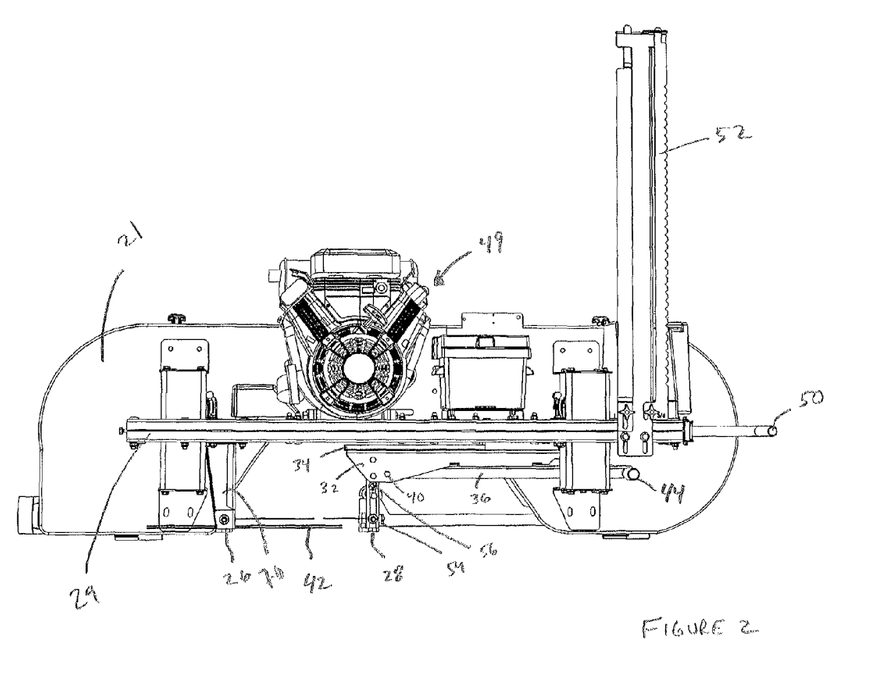
FIG. 2 is a rear elevation view of the band saw head of FIG. 1.
Figure 3:
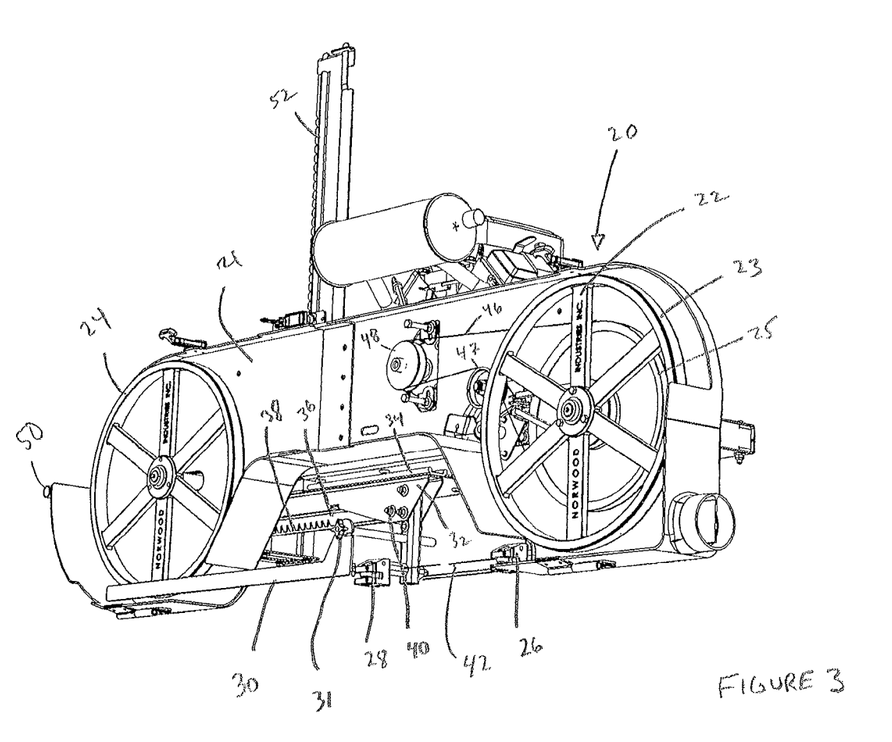
FIG. 3 is a front right side perspective view of the band saw head of FIG. 1.
Figure 4:
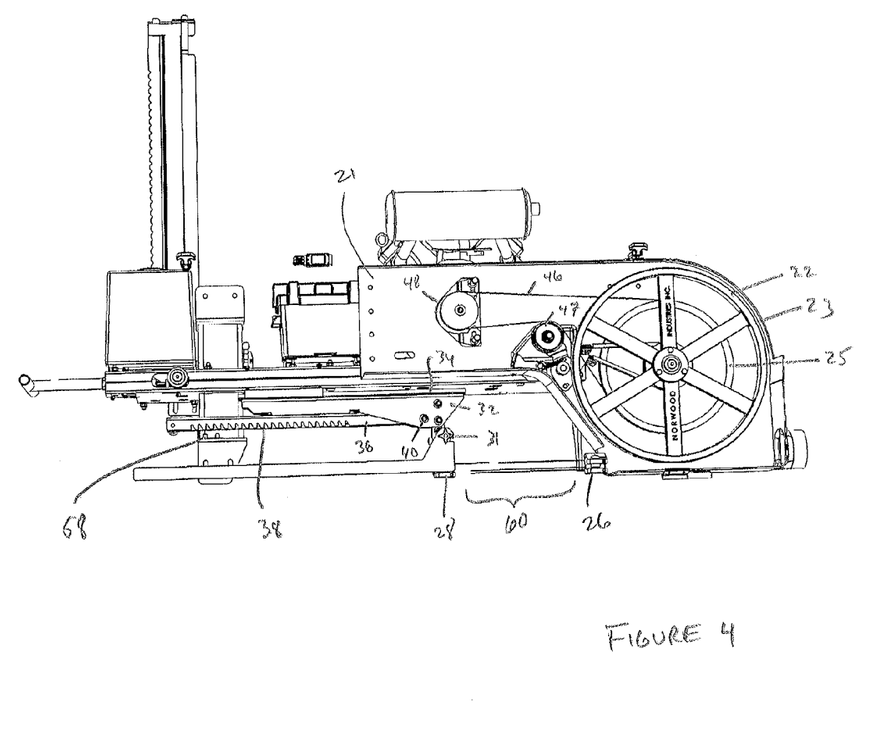
FIG. 4 is a front perspective view of the band saw head of FIG. 1 with additional components removed for a better view of certain pertinent internal components.
Figure 5:
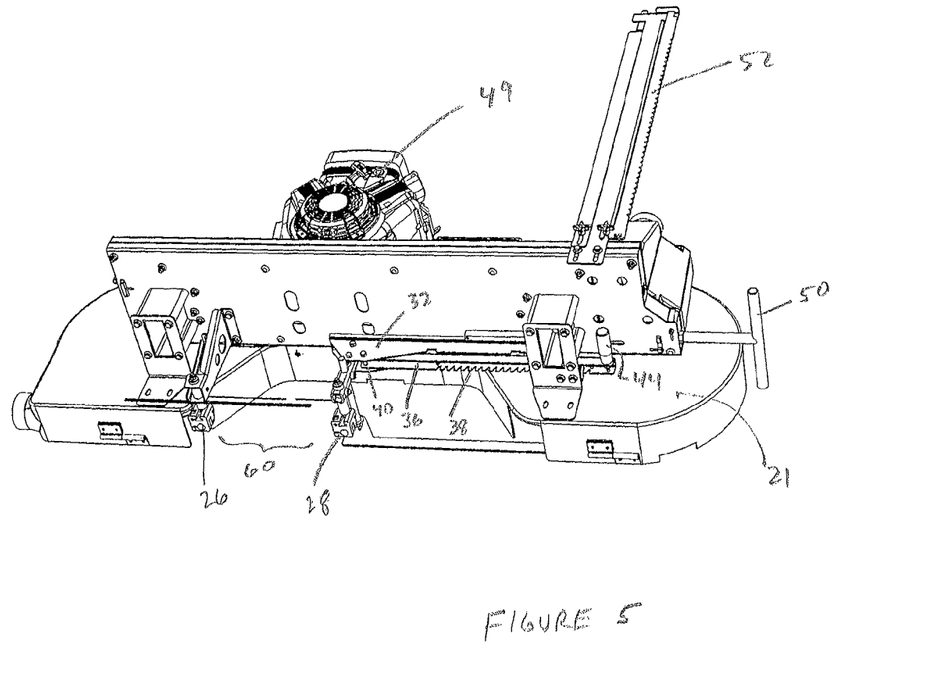
FIG. 5 is a rear bottom perspective view of the band saw head of FIG. 1.

The band saw head 20 has a saw head plate stack 29 which acts as support for drive band wheel 22 and free band wheel 24 (FIG. 2). Band saw blade 42 is entrained on and travels along outer wheel 23 of drive band wheel 22 and free wheel 24, and travels along cutting section 60, located between the drive band wheel 22 and free band wheel 24. Band saw blade 42 has transversely extending teeth capable, when in motion, of cutting a log. An inner wheel 25 of drive band wheel 22 is connected to a motor 49 by way of belt 46 which runs along inner wheel 25 and drive pulley 48 (FIG. 3). Tension on belt 46 is controlled by way of tensioning pulley 47. In use, motor 49 turns drive pulley 48, which, in turn, turns drive band wheel 22 and, as a result, saw blade 42, which rotates around drive band wheel 22 and free band wheel 24.

Tensioning pulley 47 can also be used as a clutch for the saw blade 42; instead of continuously shutting off and turning on the motor 49 to activate the cutting action of saw blade 42, tension can be released from belt 46 by adjusting tensioning pulley 47. Releasing tension in belt 46 results in the free spinning of drive pulley 48 and a decrease of rotatory force on saw blade 42, resulting in the stopping of the saw blade 42. Starting and stopping saw blade 42 in this manner decreases wear on motor 49 and belt 46, improving the longevity of these parts.

Within the path of saw blade 42 is cutting section 60, which is the section in which saw blade 42 is generally free of obstruction and can be used to cut a log. On one side of the cutting section 60 is an adjustable blade guide 28 (also seen in FIGS. 6 to 8). Adjustable blade guide 28 has a lower jaw 62 and an upper jaw 64, each having a blade guide roller, bearings, or low friction ceramic thrust blocks (not shown). In a preferred embodiment, three low friction ceramic thrust blocks are provided, one in each horizontal jaw plus one vertical at the back. Alternatively bearings are used at all three contact points or other low friction interfaces (wood for example). Note that a blade guide can also have only a top jaw plus rear thrust support (2-point support instead of three). On the other (driven) side of the cutting section 60 is a stationary blade guide 26 also having a lower jaw (not shown) and an upper jaw (not shown), each having a blade guide ceramic thrust blocks or other low friction contacts as discussed above. In operation, the saw blade travels between the blade guide rollers of both the adjustable blade guide 28 and the stationary blade guide 26. In use, the blade guide rollers prevent undesired transverse and/or vertical movement of the saw blade.

Stationary blade guide 26 is typically, and as shown, affixed to sawhead plate stack 29 via a vertical blade guide post 70 extending downwards (FIG. 2). Adjustable blade guide 28 is affixed to guide support 32, which is slidably engaged to guide slide 34, which, itself, is mounted on sawhead plate stack 29. Thus, the adjustable blade guide 28 is capable of horizontal displacement with respect to sawhead plate stack 29 through the displacement of guide support 32, along guide slide 34, thus allowing for variation of the length of cutting section 60. Also mounted on guide support 32 is guard 30 which extends horizontally away from cutting section 60 and protects blade 42. Guard 30 is adjustable and removable through the loosening of guard screw 31.

Pivotally attached to guide support 32 at its proximal end through pivot screw 40 is guide support adjuster 36 having guide support handle 44 at its distal end. Guide support adjuster 36 has teeth 38 on its lower edge, which can engage peg 58 (see FIG. 4) which is attached to saw head plate stack 29. When teeth 38 engage peg 58, guide support adjuster 36 locks and prevents horizontal displacement of guide support 32 along guide slide 34, thus locking the horizontal location of adjustable blade guide 28. Thus, to adjust adjustable blade guide 28 in a horizontal direction (and thus adjust the length of cutting section 60), an operator needs only to lift guide support handle 44 in an upwards direction, thereby pivoting guide support adjuster 36 around pivot screw 40 and disengaging teeth 38 from peg 58. The operator then simply pushes or pulls on guide support handle 44 thus displacing it and adjustable blade guide 28, through the displacement of guide support 32 along guide slide 34. Once the desired horizontal position is achieved, the operator need only release guide support handle 44. The guide support adjuster 36 will then fall, engaging one of teeth 38 on peg 58 and thereby locking horizontal displacement of adjustable blade guide 28.

Figure 6:
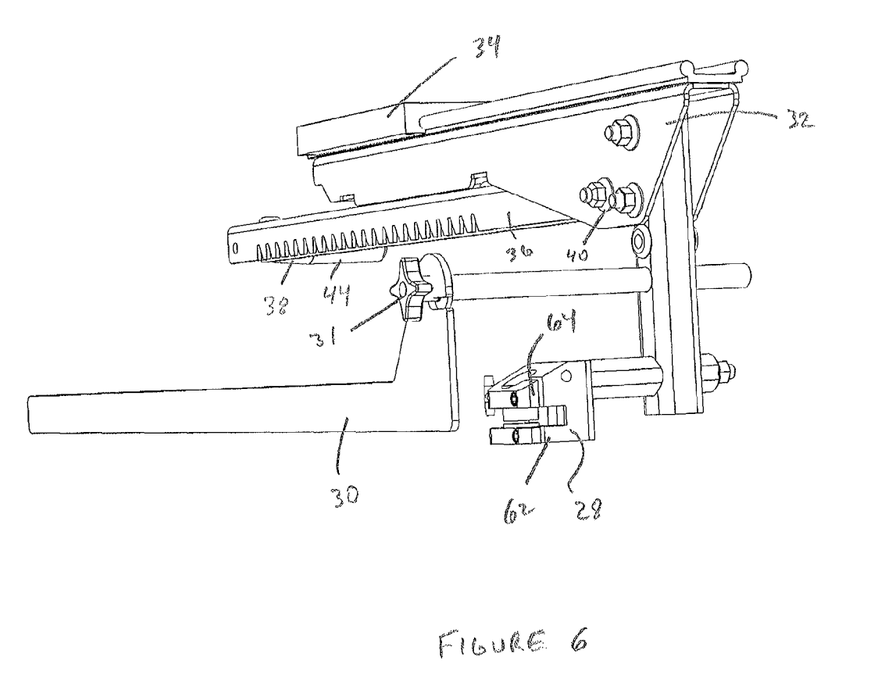
FIG. 6 is a front left perspective view of the adjustable blade guide mechanism from the band saw head of FIG. 1, shown in isolation.
Figure 7:
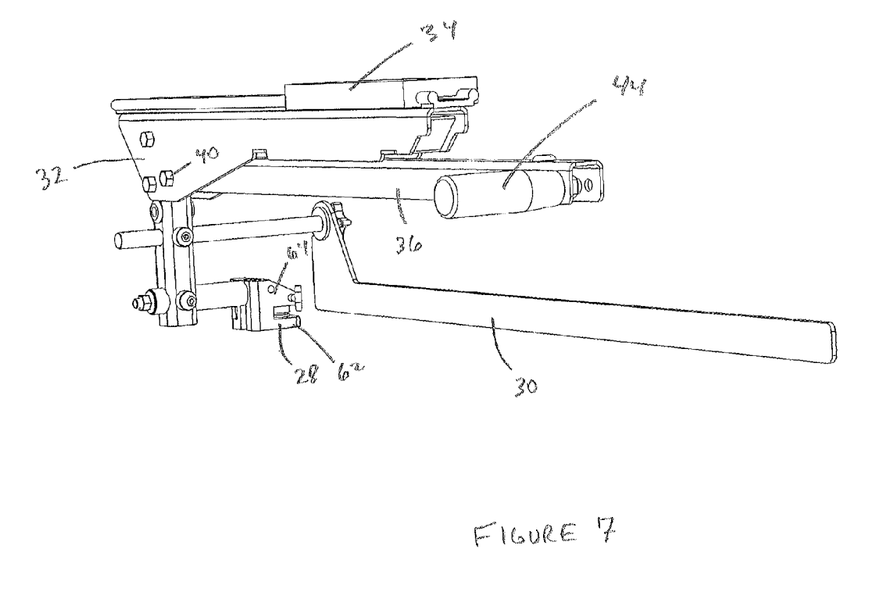
FIG. 7 is a rear right perspective view of the adjustable blade guide mechanism of FIG. 6.

FIGS. 6 and 7 show the guide support 32 and accompanying parts in isolation. Adjustable blade guide 28 is affixed to guide support 32, which is slidably engaged to guide slide 34. Pivotably attached to guide support 32 at a proximal end by pivot screw 40 is guide support adjuster 36 having teeth 38 on its lower length. Distal end of guide support adjuster 36 has guide support handle 44 which can be used by an operator to vertically displace guide support adjuster 36 around pivot screw 40. Guard 30 is affixed to guide support 32 by guard screw 31. Adjustable blade guide 28 has lower jaw 62 and upper jaw 64 which contain ceramic thrust blocks or the like (not shown) and have a rear thrust block (not shown). Lower jaw 62 and upper jaw 64 envelop the saw blade 44 when in use.

Figure 8:
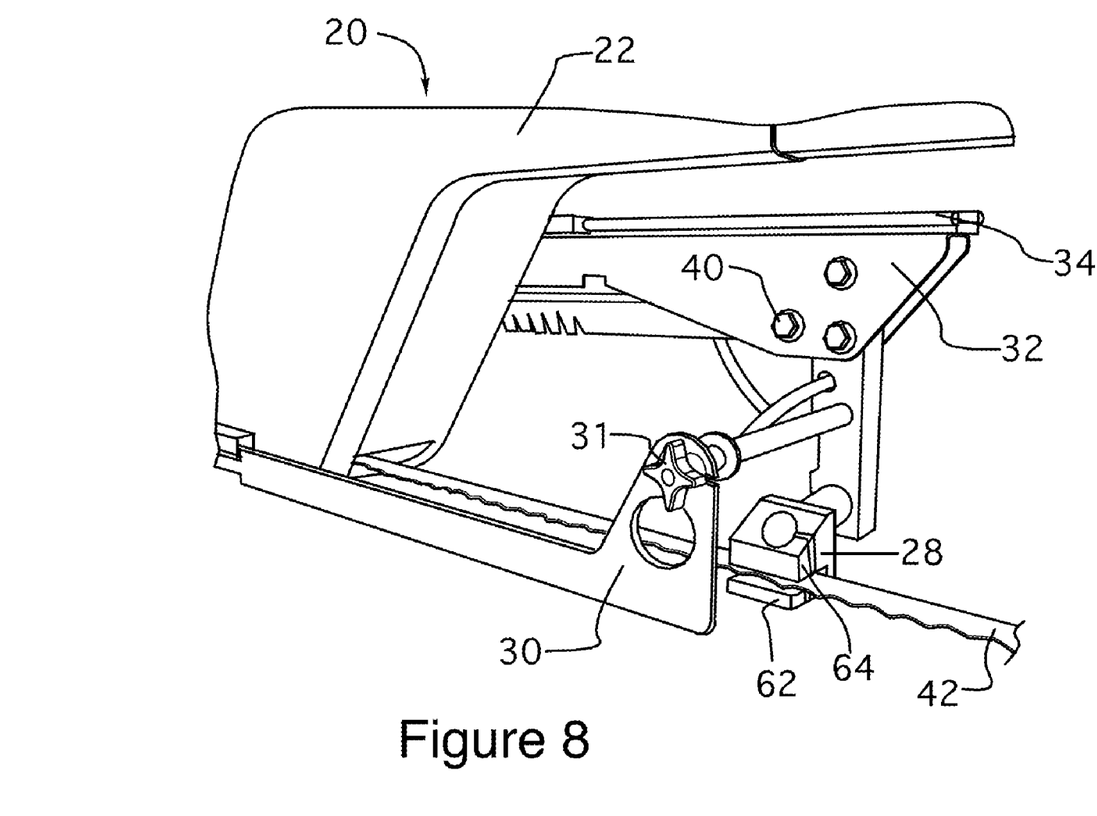
FIG. 8 is a close-up front left perspective view of the front side of the adjustable blade guide mechanism on a band saw head according to a further aspect of the present invention.

FIG. 8 is a close-up of the adjustable blade guide 28 in said sawmill. Notably, FIG. 8 shows the adjustable blade guide 28 enveloping saw blade 42. The lower jaw 62 and upper jaw 64 of adjustable blade guide 28 envelop the saw blade 42, and are affixed to guide support 32, which slidably engages guide slide 34, which, in turn, is mounted onto the underside of sawhead plate stack 29. Mounted to guide support 32 on pivot screw 40 is guide support adjuster 36. Also affixed to guide support 32 by guard screw 31 is guard 30, which is shown with alternating black and white stripes and a "danger" symbol. Guard screw 31 is a standard T-bolt screw.

It is to be understood that the present invention is not limited to the embodiments described above, but encompasses any and all embodiments within the scope of the following claims.

ELEMENT LIST

15—rails
16—sawmill base
18—carriage
20—band saw head
21—guard
22—drive band wheel
23—outer wheel
24—free band wheel
25—inner wheel
26—stationary blade guide
28—adjustable blade guide
29—saw head plate stack
30—guard
31—guard screw
32—guide support
34—guide slide
36—guide support adjuster
38—teeth
40—pivot screw
42—blade
44—guide support handle
46—belt
47—tensioning pulley
48—drive pulley
49—motor
50—blade tensioning T-handle
52—depth of cut ruler
54—guide adjuster
56—guide adjuster
58—peg
60—cutting section
62—lower blade guide jaw
64—upper blade guide jaw
66—vertical posts
68—crank
70—vertical blade guide post

The invention claimed is:

1. A saw head for a sawmill, said saw head comprising:
a frame;
a drive driving an elongate saw blade;
a blade guide contacting said elongate saw blade and capable of decreasing transverse and/or vertical movement of the elongate saw blade when said blade is in motion;
said blade guide affixed to a guide support which is slidably engaged to the frame;
said guide support having a guide support adjuster pivotally connected thereto at a proximal end, having a distal end, and having teeth on its lower edge, said teeth capable of engaging a peg affixed to the frame;
whereby, when the distal end is lifted, the guide support is capable of horizontal motion thereby adjusting the position of the blade guide on the saw blade, and, when the distal end is dropped, at least one of said teeth engage the peg, locking the guide support in place and preventing said horizontal motion.

2. The saw head of claim 1, wherein the saw head, when affixed to a saw head support, is capable of vertical displacement thereto.

3. The saw head of claim 1, further comprising a guard affixed to the guide support.

4. The saw head of claim 1, wherein said elongate saw blade is a band saw blade.

5. The saw head of claim 1, wherein said elongate saw blade is a reciprocating saw blade.

6. The saw head of claim 1, further comprising a second blade guide affixed to said frame, contacting said saw blade, and capable of decreasing transverse movement of the saw blade when said blade is in motion, whereby the line between the blade guide and the second blade guide define a cutting section.

7. The saw head of claim 1, further comprising a handle at said distal end of said guide support adjuster.

8. A sawmill, comprising: a sawmill base, extending in a generally horizontal direction, and having at least one rail; a sawmill carriage, capable of longitudinal displacement across said rail; said sawmill carriage having at least one vertical support, extending in a generally vertical direction from said base, and supporting a saw head and capable of vertical displacement along said vertical support;
wherein the saw head further comprises:
a frame;
a drive driving an elongate saw blade;
a blade guide contacting said elongate saw blade and capable of decreasing transverse and/or vertical movement of the elongate saw blade when said blade is in motion; said blade guide affixed to a guide support which is slidably engaged to the frame;
said guide support having a guide support adjuster pivotally connected thereto at a proximal end, having a distal end, and having teeth on its lower edge, said teeth capable of engaging a peg affixed to the frame; whereby, when the distal end is lifted, the guide support is capable of horizontal motion thereby adjusting the position of the blade guide on the saw blade, and, when the distal end is dropped, at least one of said teeth engage the peg, locking the guide support in place and preventing said horizontal motion.

9. The sawmill of claim 8, wherein the saw head of claim 1, wherein the saw head, when affixed to said vertical support, is capable of vertical displacement thereto.

10. The sawmill of claim 8, wherein the saw head further comprises a guard affixed to the guide support.

11. The sawmill of claim 8, wherein said elongate saw blade is a band saw blade.

12. The sawmill of claim 8, wherein said elongate saw blade is a reciprocating saw blade.

13. The sawmill of claim 8, wherein the saw blade further comprises a second blade guide affixed to said frame, contacting said saw blade, and capable of decreasing transverse movement of the saw blade when said blade is in motion, whereby the line between the blade guide and the second blade guide define a cutting section.

14. The sawmill of claim 8, wherein the saw blade further comprises a handle at said distal end of said guide support adjuster.

* * * * *